W. S. DAVIS.
Bale-Tie Fastenings.
No. 151,572.
Patented June 2, 1874.
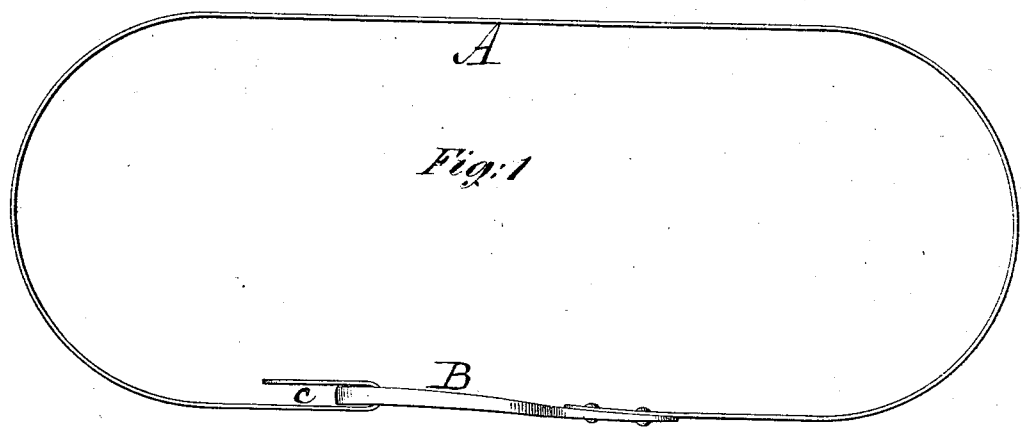
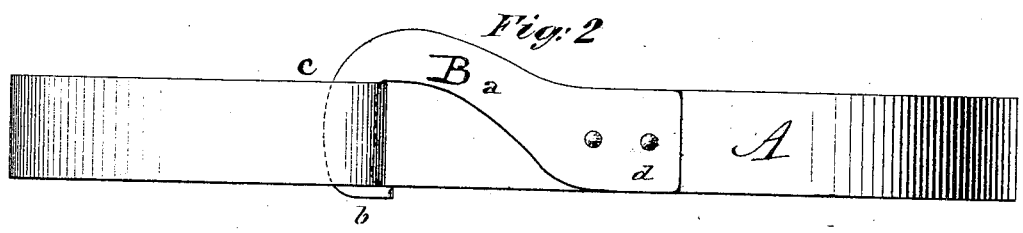
Witnesses:
Michael Ryan
Fred. Wayne
W. S. Davis
by his Attorneys
Brown & Allen

UNITED STATES PATENT OFFICE.

WATERS S. DAVIS, OF GALVESTON, TEXAS.

IMPROVEMENT IN BALE-TIE FASTENINGS.

Specification forming part of Letters Patent No. 151,572, dated June 2, 1874; application filed February 7, 1874.

CASE A.

*To all whom it may concern:*

Be it known that I, WATERS S. DAVIS, of Galveston, in the county of Galveston and State of Texas, have invented an Improved Bale-Tie Fastening, of which the following is a specification:

The invention consists in a peculiarly-constructed hook, riveted to one end of the band or bale hoop, to engage with a loop formed in the other end of the band, after the band is passed around the bale, said hook having a flat shank, of a width greater than the neck of the hook and about equal to the width of the band, one side of the shank being of a tapering form, so that when the band is riveted upon the shank of the hook the thickness of the two combined will be less than the thickness of the hook portion proper, the object being to retain a great strength in the hook and neck portion where great strain is exerted, and at the same time lessen the strain on the rivet-fastenings.

In the accompanying drawing, Figure 1 is an edge view, and Fig. 2 a side view, of a bale-hoop having my improved fastening attached.

The band or hoop A is made of hoop-iron in the usual way. To one end is riveted a hook, B, which is made of wrought or malleable cast-iron, as may be preferred. The hook has its sides flattened, and is riveted flatwise to the band. Its opening is in a direction corresponding with that of the edges of the band, and its bottom is straight and at a right angle to the length of the band. When the band is passed around the bale the hook B engages with a loop, c, formed in the opposite end, and the shape of the hook is such that the point of its engagement with the loop is in line with the point where it is riveted to the opposite end, so that the strain is uniform on all parts of the hook. The hook is so wrought as to have a large opening formed by constructing the hook with a narrow neck portion, $a$, of a thickness equal to the thickness of the hook portion $b$, while the shank portion $d$ is made tapering by being drawn out, so as to economize material and make it assume a width equal to the width of the band, and of a thickness much less than the neck or hook portion, the object being to secure and retain great strength in the said neck and hook portions, and to have the combined thicknesses of the shank and band, when connected together, less than the neck or hook portions, so as to lessen the strain on the fastening-rivets by the outward pressure of the cotton.

What I claim as new, and desire to secure by Letters Patent, is—

The open hook B, having the narrow neck portion $a$, with its flattened and tapering or inclined shank portion $d$, and hook portion $b$, constructed as herein shown, for the purpose specified.

WATERS S. DAVIS.

Witnesses:
 HENRY T. BROWN,
 MICHAEL RYAN.